United States Patent [19]
Moore

[11] Patent Number: 4,768,896
[45] Date of Patent: Sep. 6, 1988

[54] OFFSET BREAKWATER DEVICE

[76] Inventor: Walter L. Moore, 3800 Woodbrook Cir., Austin, Tex. 78759

[21] Appl. No.: 946,319

[22] Filed: Dec. 22, 1986

[51] Int. Cl.⁴ .......................... E02B 3/06; E02B 3/04
[52] U.S. Cl. ........................................ 405/26; 405/21
[58] Field of Search ................. 405/21, 26, 27, 28, 405/63, 219; 114/230, 258, 263, 266, 267

[56] References Cited

U.S. PATENT DOCUMENTS

| | | | |
|---|---|---|---|
| 1,691,335 | 11/1928 | Campbell | 405/34 |
| 2,388,171 | 10/1945 | McVitty | 405/52 |
| 2,652,692 | 9/1953 | Hayden | 405/35 |
| 2,710,505 | 6/1955 | Magill | 405/28 |
| 2,972,233 | 2/1961 | Askevold | 405/27 |
| 2,994,201 | 8/1961 | Hutchings | 405/27 |
| 3,011,316 | 12/1961 | Wilson | 405/28 |
| 3,222,870 | 12/1965 | Miller et al. | 405/27 |
| 3,465,528 | 9/1969 | Usab | 405/27 |
| 3,800,543 | 4/1974 | Moore | 405/26 |
| 3,969,901 | 7/1976 | Matsudaira et al. | 405/26 X |
| 4,225,268 | 9/1980 | Treu | 405/27 |
| 4,406,564 | 9/1983 | Hanson | 405/26 |
| 4,642,000 | 2/1987 | Lin | 405/219 X |

FOREIGN PATENT DOCUMENTS

| | | |
|---|---|---|
| 1909799 | 2/1970 | Fed. Rep. of Germany . |
| 1539704 | 9/1968 | France . |
| 81703 | 7/1981 | Japan ..... 405/26 |
| 89609 | 7/1981 | Japan ..... 405/26 |
| 89610 | 7/1981 | Japan ..... 405/26 |
| 6904697 | 10/1969 | Netherlands . |

OTHER PUBLICATIONS

Publication entitled "Floating Breakwaters: State of the Art Literature Review", by L. Z. Hales, U.S. Army Corps of Engineers, Technical Report 81-1, Oct. 1981.

Primary Examiner—Randolph A. Reese
Assistant Examiner—John A. Ricci
Attorney, Agent, or Firm—Arnold, White & Durkee

[57] ABSTRACT

A mobile, buoyant breakwater structure is disclosed having a plurality of wave reflecting surfaces alternatingly offset from each other by a distance approximating one-half the wave length of impinging waves to decrease the motion of the structure and the transmission of wave motion past the structure. An anchoring system is provided which is connected to the breakwater structure and adapted to act substantially through an action center of the structure, the location of which is defined by the intersection of the plane of action of the resultant buoyant force on the structure and the plane of action of the resultant horizontal force on the structure for a selected designed wave.

5 Claims, 6 Drawing Sheets

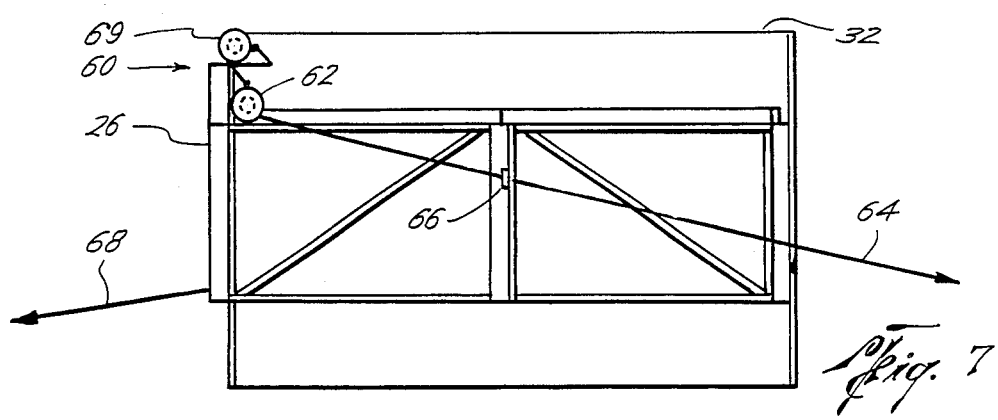
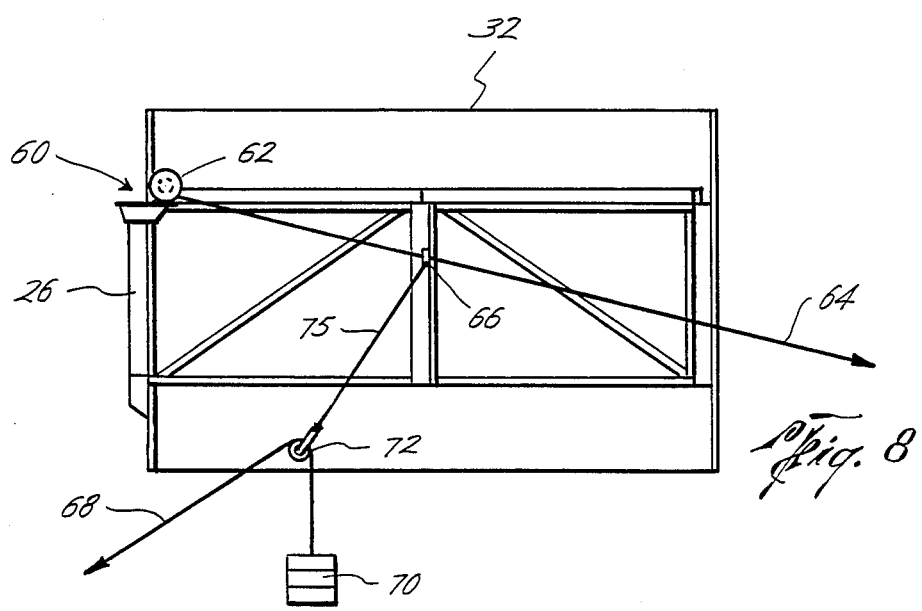
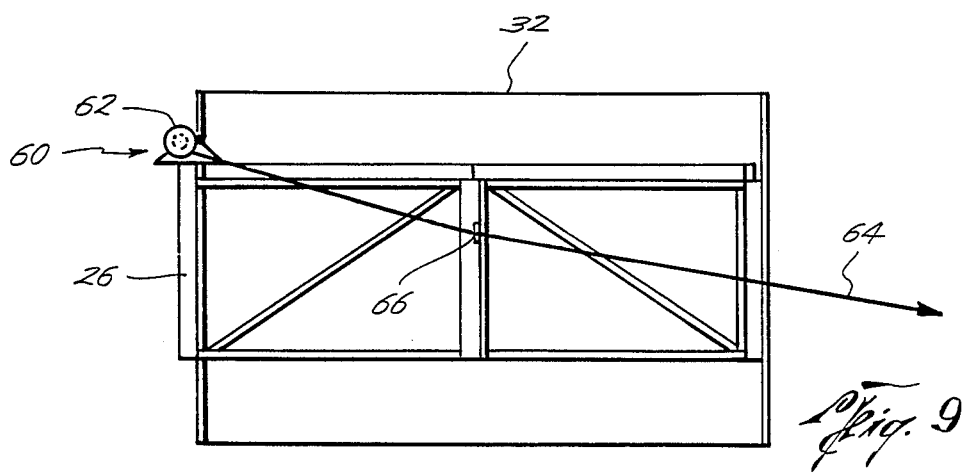

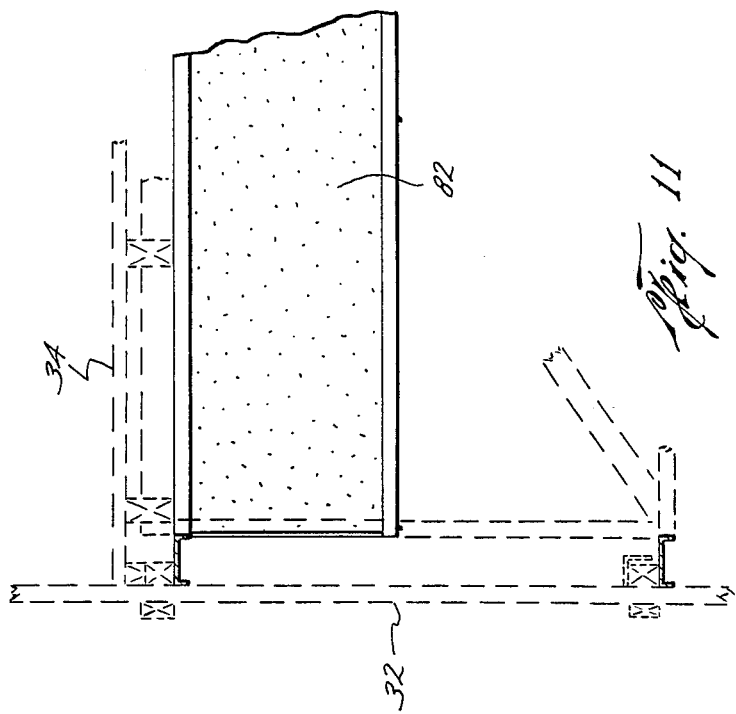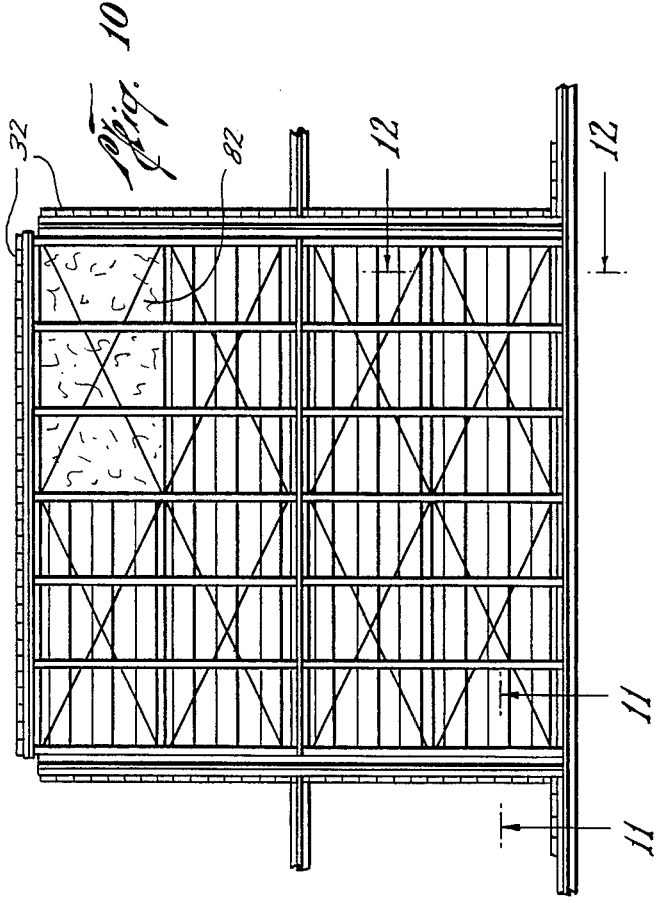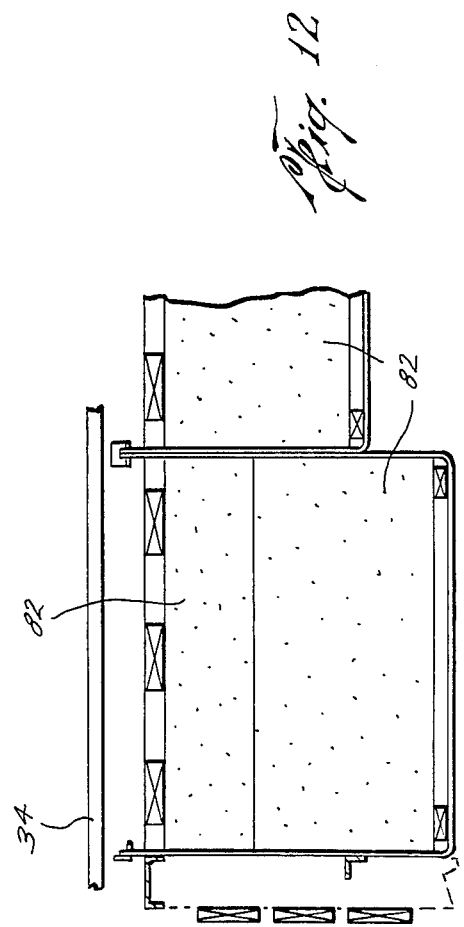

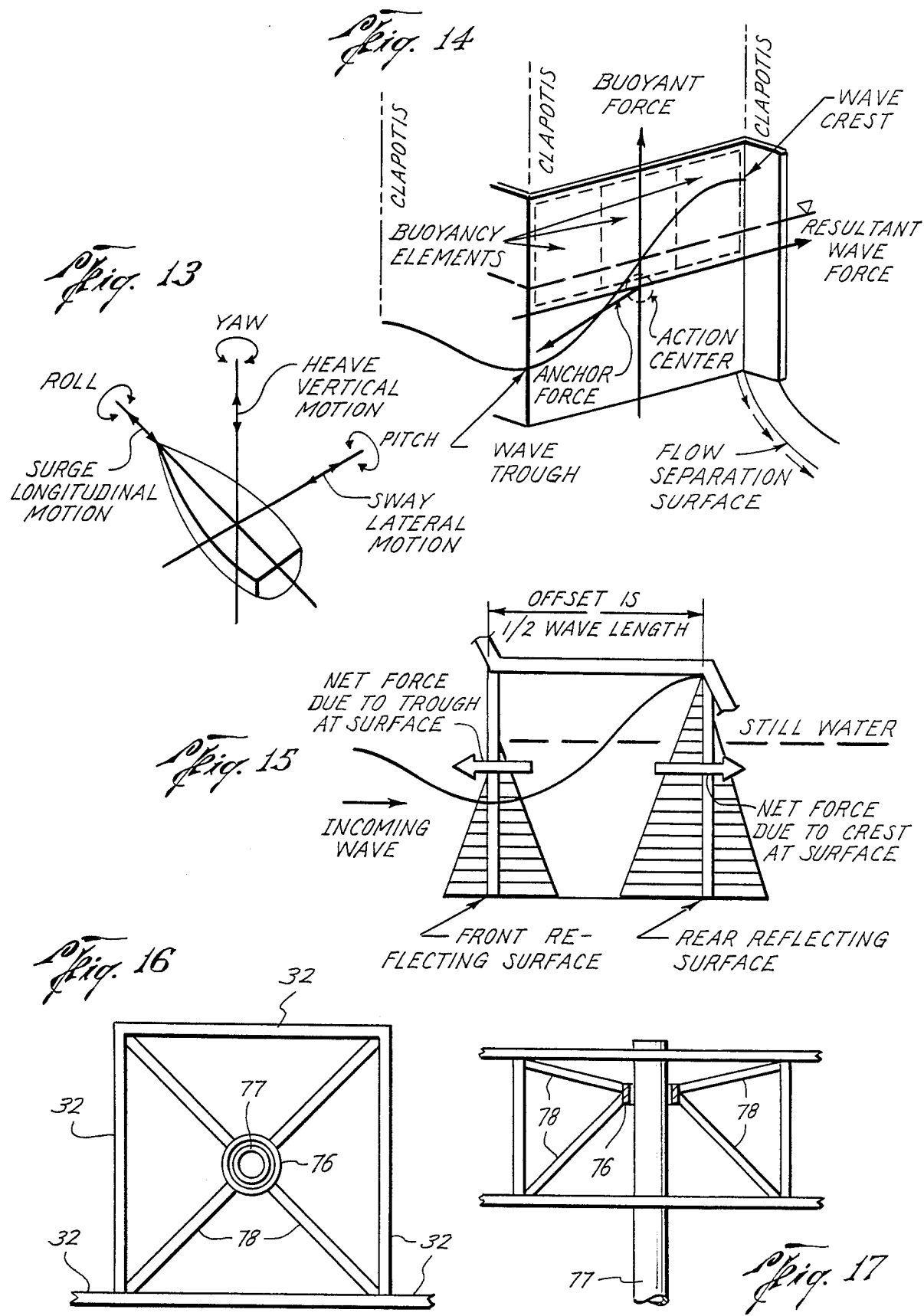

OFFSET BREAKWATER DEVICE

BACKGROUND OF THE INVENTION

The invention relates generally to breakwater devices, and more particularly, it concerns an improved breakwater apparatus adapted to be anchored to minimize roll of the apparatus and a method for anchoring a breakwater apparatus to minimize roll of the apparatus.

In my prior patent, U.S. Pat. No. 3,800,543, I described an offset breakwater configuration that was believed to be a significant improvement over existing breakwaters. The breakwater configuration described in that patent included substantially vertical wave reflecting surfaces which were positioned relative to each other and relative to on-coming waves such that the horizontal force effect of the on-coming waves could be substantially balanced and cancelled. This patent and the teachings included therein are hereby fully incorporated by reference.

The principle behind the breakwater configuration described in my prior patent related to the positioning of vertical wave surfaces such that the wave surfaces were disposed in two substantially parallel planes separated from each other by a distance approximately equal to one-half the wavelength of the anticipated on-coming waves. As explained therein, such configuration caused the crest of the wave to strike the surfaces contained in one plane at the same time that the trough of the wave was striking the surfaces contained in the other plane. Since the water behind the two planes remained substantially level, this configuration resulted in opposing horizontal force components on the two planes which substantially cancelled each other out. The proportion of the wave form transmitted through the breakwater was thereby substantially reduced—yielding an improved design for a breakwater for minimizing waves behind the breakwater.

While the breakwater configuration described in U.S. Pat. No. 3,800,543 is believed to be a significant improvement over prior breakwaters, it has been determined that still more improvement may be provided. Specifically, it has been observed that the mooring lines or anchor lines typically used to secure such breakwaters in deep water can introduce additional force components which may cause the breakwater to roll and thereby transmit wave motion behind the breakwater. Similarly, because of the varying profiles in forces exerted by waves on the breakwater device, it is possible that the component of roll may be enhanced. It is therefore desirable to provide a breakwater device which incorporates the advantages of the breakwater configuration described in U.S. Pat. No. 3,800,543, while at the same time minimizing roll of the breakwater such that the proportion of the wave form transmitted through the breakwater is even further minimized.

SUMMARY OF THE INVENTION

The present invention provides such a breakwater device which incorporates the advantages of my prior design while providing an anchoring system adapted to minimize roll. Specifically, the present invention consists of a mobile buoyant structure comprising a plurality of wave reflecting surfaces which are operatively interrelated and supported such that the wave reflecting surfaces are disposed in use in a substantially vertical position so that waves impinging thereon will be reflected back upon themselves. The reflecting surfaces are further arranged in a first set of surfaces and a second set of surfaces wherein the first set of surfaces are spacially located in substantially a first single vertical plane and the second set of surfaces are spacially located in substantially a second vertical plane. For purposes of definition, we may assume that the surfaces in the first vertical plane are disposed in use such that approaching waves impinge on said surfaces before impinging on the surfaces in the second vertical plane.

The first vertical plane is separated from the second vertical plane by a distance which is measured in the direction of approach of impinging waves in use and which approximates one-half the wave length of the waves expected to impinge upon the surfaces located in the planes. The sum of the surface area of all the surfaces in the first vertical plane is approximately equal to the sum of the surface area of all the surfaces in the second vertical plane and the surfaces are arranged such that the net moment about a vertical axis or center of the structure span approximates zero in order to minimize yaw of the structure in use. The surfaces in the second vertical plane are separated from each other and disposed and the surfaces in the first vertical plane are separated from each other and disposed such that the surfaces in the second vertical plane line up directly behind a gap between the surfaces in the first vertical plane.

The mobile buoyant structure further includes an anchoring means for anchoring said structure in place. The anchoring means is adapted to act substantially through an action center of the structure in order to minimize roll of the structure and to minimize creation of a couple by the anchoring means. The location of the action center, as will be described in greater detail below, is approximately at the intersection of the line of action of the resultant buoyant force on the structure and the line of action of the resultant horizontal force caused by a selected design wave on the structure.

In a preferred embodiment of the present invention, the anchoring means may include an anchoring guide mounted to the structure positioned on the action center of the structure. The anchoring guide is adapted to receive and support an anchoring line such that the force on the anchoring line acts through the action center in use.

Accordingly, the present invention provides a breakwater device which incorporates the advantages of my prior device while minimizing roll of the device. This and other advantages of the present invention will be more fully appreciated by the following detailed description of the invention.

BRIEF DESCRIPTION OF THE DRAWINGS

This invention will further be illustrated by reference to the appended drawings which illustrate a particular embodiment of the improved breakwater device in accordance with the present invention.

FIG. 7 is a side sectional view of the breakwater device illustrating a mooring line layout of the present invention.

FIG. 8 is an alternative mooring line layout for the present invention.

FIG. 9 is still another alternative mooring line layout of the present invention.

FIG. 10 is a plan view of the flotation layout of a preferred embodiment of the present invention.

FIG. 11 is a sectional view taken along line 11—11 of FIG. 10.

FIG. 12 is a sectional view taken along line 12—12 of FIG. 10.

FIG. 13 is a diagram illustrating the various motions of a floating vessel.

FIG. 14 is a diagram illustrating the forces on the breakwater causing roll.

FIG. 15 is a diagram illustrating the approximation of the horizontal force component for a selected wave design.

FIG. 16 is a top view of an alternative embodiment of the positioning or anchoring means of the present invention.

FIG. 17 is a side view of the embodiment shown in FIG. 16.

DESCRIPTION OF THE PREFERRED EMBODIMENT

Figure 1:
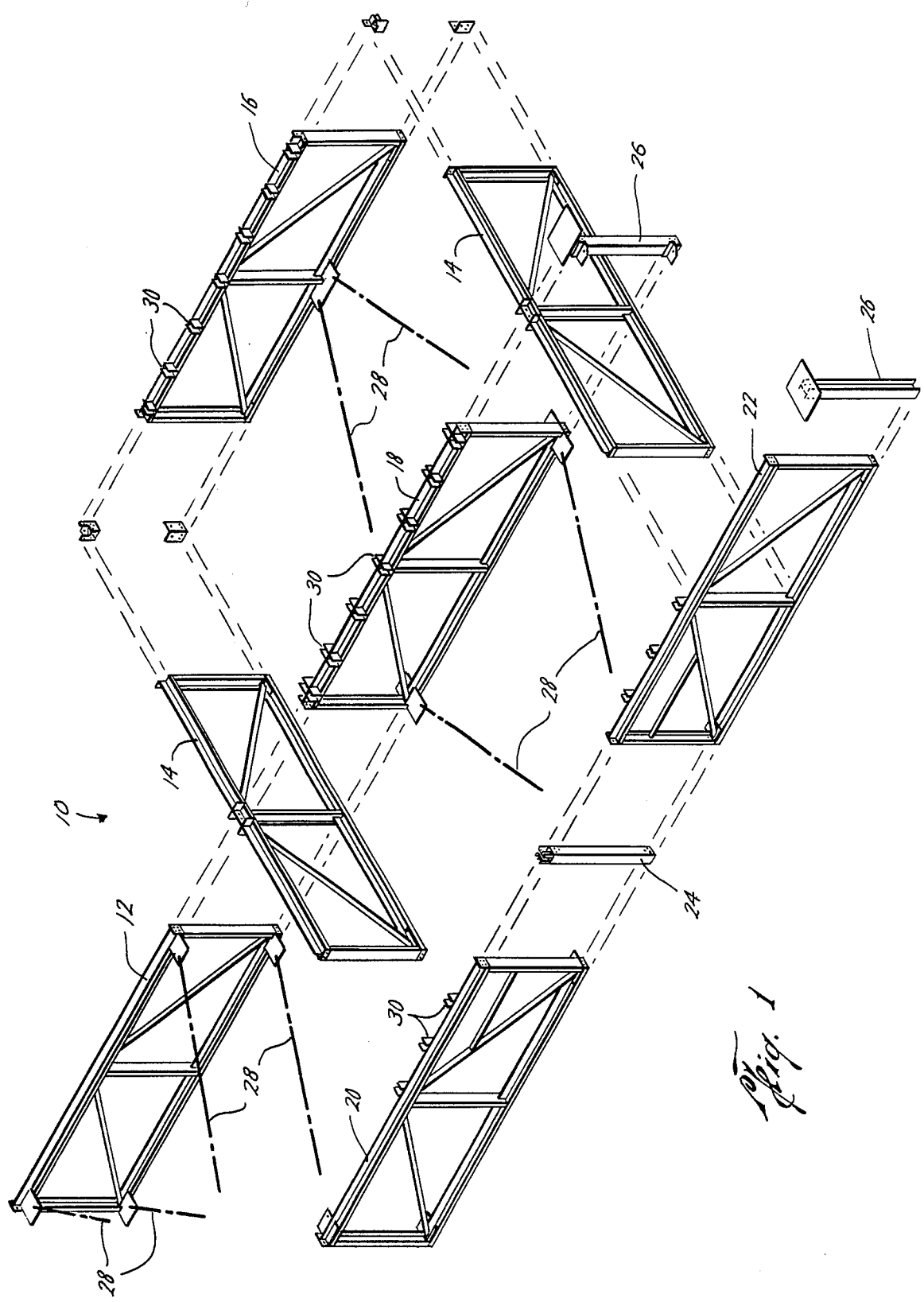
FIG. 1 is an exploded isometric view of the trusses utilized in constructing a section of the breakwater device of the present invention.

It will be understood that the present invention may be implemented in a number of ways, within the scope of the claims appended hereto. The presently preferred embodiment of the invention will now be described.

As stated above, the present invention relates to an improvement over the device described in my prior patent, which improvement is adapted to minimize roll of the breakwater device. To fully appreciate the design of the present invention, it is helpful to review certain principles.

There are two primary types of breakwaters, fixed breakwaters and floating breakwaters. Fixed breakwaters may be composed of many different materials, including rock, cast blocks, etc. Fixed breakwaters must be supported to the bottom and may therefore be extremely expensive in deep water. Additionally, fixed breakwaters may create environmental problems by interfering with water circulation.

Floating breakwaters avoid many of the problems of fixed breakwaters by providing breakwaters which are both flexible in height (to account for fluctuating water levels) and flexible in placement (to address expanding harbor needs). The analysis of the forces on most designs of floating breakwaters is difficult, if not impossible. One of the advantages of the design shown in U.S. Pat. No. 3,800,543 is that it presents a vertical surface against which to calculate wave forces and thereby provides a design for which analysis may be more easily performed.

The motions of a floating breakwater may be described using ship terminology as shown in FIG. 13. Sway may be defined as the non-rotational horizontal motions side to side along the transverse axis. Roll is the rotational motion about the longitudinal axis. Heave is the non-rotational vertical motion along the vertical axis. Yaw is the rotational motion about the vertical axis. Pitch is the rotational motion about the transverse axis. Finally, surge is the fluctuating longitudinal motion along the longitudinal axis.

For the purposes of the present application, the longitudinal axis of the breakwater shall be considered to correspond to the longitudinal axis of a ship. For critical conditions, the longitudinal axis of the breakwater is parallel to the wave crest such that the waves propagate along the transverse axis of the breakwater. The significant motions for breakwater therefore are sway, roll, and heave. Yaw, pitch and surge are not significant for a breakwater due to the relatively long length of the structure.

The offset breakwater configuration described and claimed in U.S. Pat. No. 3,800,543 primarily attempted to minimize sway of a breakwater device by balancing the net horizontal forces on the breakwater device. The design of the present invention seeks, among other advantages, to minimize roll of a breakwater constructed in accordance with U.S. Pat. No. 3,800,543 through an anchoring system adapted to act through the "action center" of the breakwater. The location of this "action center" requires a general understanding of the forces acting on the breakwater and an application of this understanding to approximate the intersection of the forces as described below.

The forces causing a breakwater to roll are shown in FIG. 14. As shown in FIG. 14, for simplification, the forces may be characterized in two ways. First, there is a resultant horizontal force which is the resultant of the horizontal forces exerted on the breakwater device for a selected wave condition (hereinafter designated as the "design wave"). Second, there exists a resultant buoyant force acting upwardly to keep the breakwater afloat.

Since wave conditions are constantly changing, it is not possible to predict with total accuracy the pressure distribution which will be encountered by the vertical surfaces. Rather, a design wave for a given application should be selected for design purposes. This wave may correspond to the wave height estimated by a qualified observer for a given wave field. Alternatively, a slightly larger wave than the wave height estimated by the observer may be selected in order to account for more extreme conditions. It is only important that a wave be selected which will be representative of or larger than the waves to be usually encountered by the breakwater device.

Having selected a design wave, one may then approximate the pressure distribution which will be exerted on the respective faces for a given wave as shown in FIG. 15. While the pressure distribution may not actually yield a straight line as shown in FIG. 15, it has been found that the use of a straight line approximation is sufficient for the present computations. It should be understood that other methods known to those of skill in the art for determining a projected pressure distribution on the vertical surfaces for a design wave may be utilized (some of which, while more complex, may provide greater accuracy). Given a projected pressure distribution on the vertical surfaces for a design wave, the resultant horizontal force and its line of action may then be determined. This line of action may be viewed as acting in a horizontal plane along the length of the breakwater. Calculations have shown that the location of the line of action for the resultant horizontal force is generally near the water surface and does not vary greatly with wave height.

In a similar manner, the resultant buoyant force for the breakwater may be determined. The resultant buoyant force will be dependent upon the distribution of the weight of the breakwater device and the distribution of the buoyant elements used to keep the breakwater level and to keep the breakwater afloat. Again, the resultant buoyant force may be resolved to acting within a vertical plane along the length of the breakwater device.

The point where the plane of action for the resultant horizontal force and the plane of action for the resultant buoyant force intersect defines a line which may be called the "action line" or "action center". This "action line" or "action center" provides the basis of the anti-roll aspect of the present invention.

Specifically, it has been determined that if the line of action of the anchor force could be made to pass exactly through the real action center for a given wave there would be no roll moment on the structure for that wave. In practice, since the design wave must be estimated and since the action center cannot be determined with total accuracy, the roll moment will seldom, if ever, be zero. However, by approximating the location of the action center as described above, and by adapting the line of action of the anchor force to pass through the action center, the roll moment and the resulting roll of the breakwater may be minimized.

Referring now to FIGS. 1-9, the breakwater device of the present invention is generally represented by a framework 10, vertical reflecting surfaces 32, an anchoring means or system 60, and a flotation system 80. The framework 10 of the present invention may be comprised of any framework suitable for supporting the wave reflecting surfaces 32 in a vertical, offset configuration as described in U.S. Pat. No. 3,800,543. In the preferred embodiment, the framework is comprised of a mid-span truss 12, a side support truss 14, a front support truss 16, a deck support truss 18, a first rear support truss 20, a second rear support truss 22, a flush post 24, and. a mooring post 26 as shown in FIG. 1. The trusses and posts are interconnected by suitable means such as bolts or welding to create the repeated offset or corrugated configuration as shown in FIGS. 1-4.

In the preferred embodiment, the breakwater may be used as a dock or passageway through the provision of decking on top of the breakwater. In such a case, the front support truss 16, the deck support deck 18, and the appropriate portions of the first and second rear support trusses 20 and 22, may each include mounting members 30 for receiving and mounting a deck, if desired.

Figure 2:
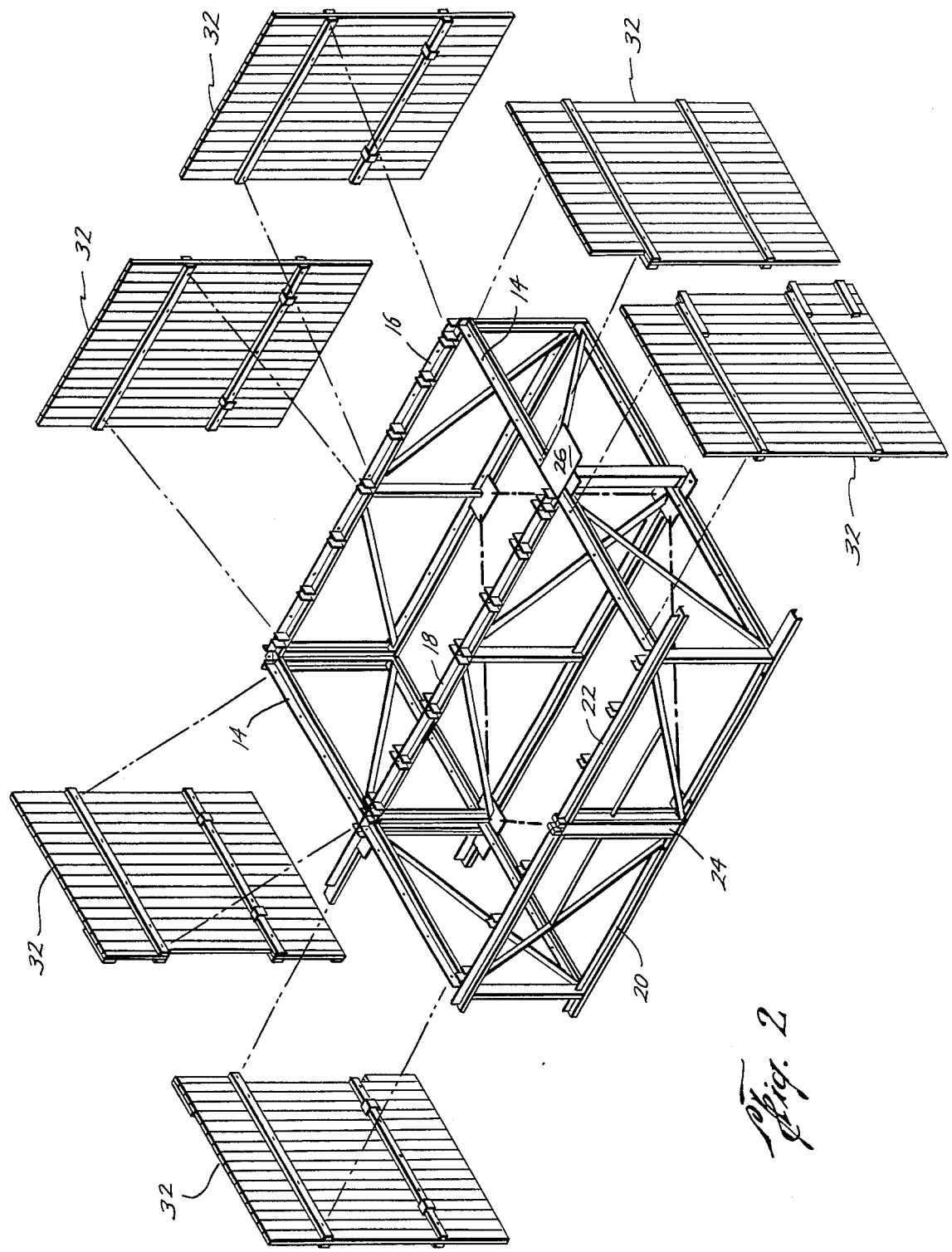
FIG. 2 is an isometric view of the trusses illustrated in FIG. 1, further illustrating the assembly of the trusses shown in FIG. 1, and the placement of wave reflecting surfaces onto the trusses shown in FIG. 1.
Figure 5:
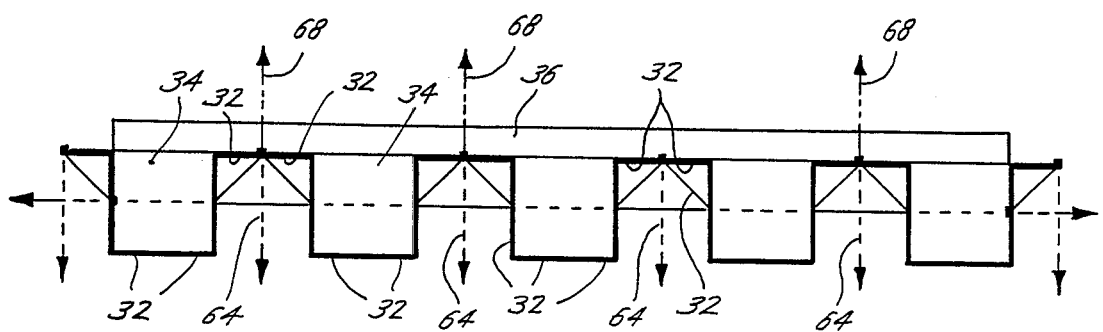
FIG. 5 is a plan view of a breakwater device constructed in accordance with the present invention, showing a mooring layout for the invention.
Figure 6:
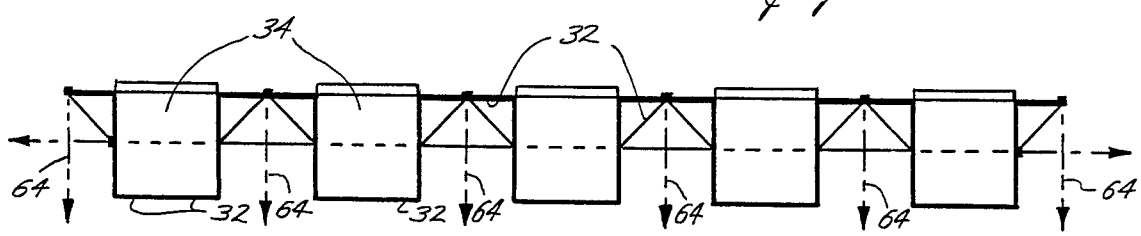
FIG. 6 illustrates an alternative mooring layout to the mooring layout illustrated in FIG. 5.

Referring now to FIGS. 2, 5 and 6, vertical reflecting surfaces 32 are connected to the front support truss 16, to the side support trusses 14, and to the first and second rear support trusses by nuts and bolts or other suitable means. The exact configuration of the respective vertical reflecting surfaces 32 may be varied to be complementary with the respective truss to which it is attached as shown in FIG. 2. The breakwater may further include decks 34 and a walkway 36 such as shown in FIG. 5.

The truss construction shown in FIGS. 1-6 offers several advantages over many other types of construction. For example, the use of such trusses facilitates the construction of the breakwater device at the site at which the breakwater is to be used. The truss construction also simplifies the repair and maintenance of the breakwater device.

Figure 3:
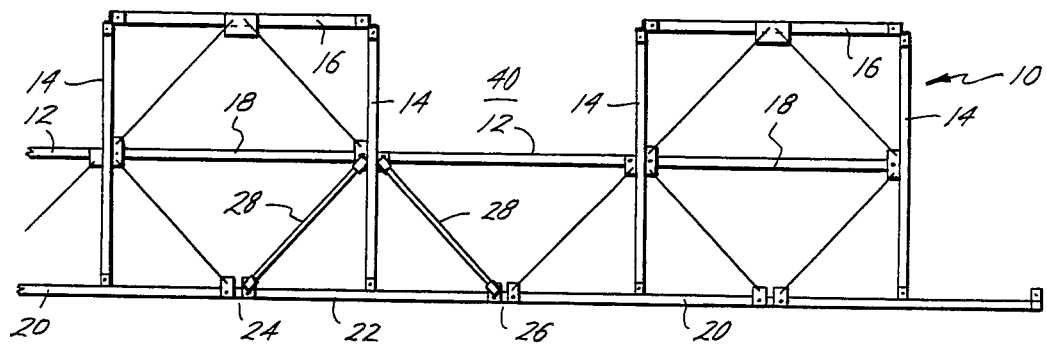
FIG. 3 is a plan view of the lower framework shown, in part, in FIGS. 1 and 2, further illustrating the construction of the breakwater device to provide means for mounting the offset vertical surfaces.
Figure 4:
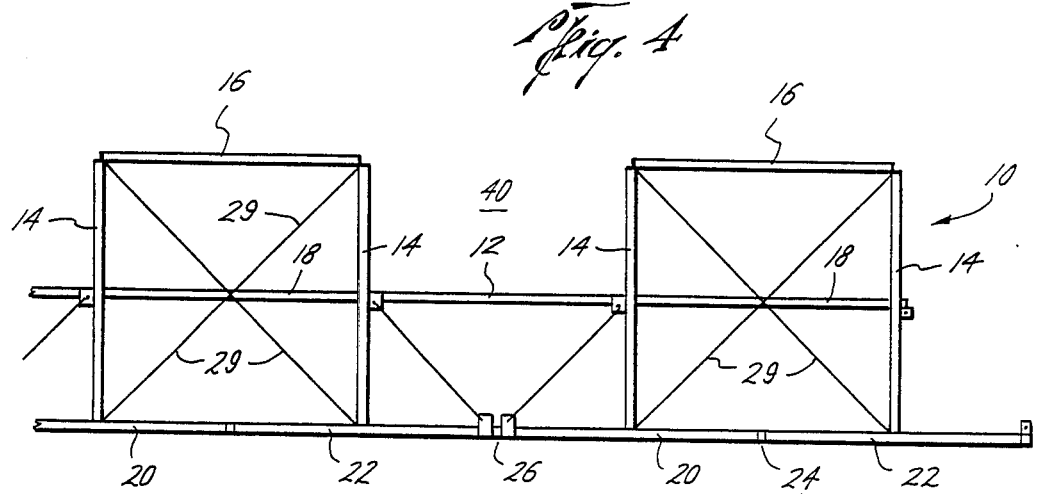
FIG. 4 is a plan view of the upper framework for the part of the structure illustrated in FIG. 3.

An additional advantage of the truss and vertical reflecting surface construction is that it provides a rigid structure while at the same time minimizing the heave encountered by the breakwater due to wave action. In particular, the wave reflecting surfaces 32 prevent incoming waves from acting on any of the trusses with the exception of the mid-span truss 12. In turn, in the preferred embodiment, the mid-span truss 12 is positioned within the open zone 40 (as shown in FIGS. 3 and 4) to extend across the open zone at the line of minimal wave action within the open zone. This preferred position is located at the node point of the standing wave pattern within the open zone 40 and is therefore located along a line of minimum vertical wave movement. This acts to minimize the wave forces on the mid-span truss 12 and thereby minimizes any heave producing or roll producing effect which the waves may exert on mid-span truss 12 of the breakwater. Given appropriate design of the breakwater device, the wave action of the water behind the vertical reflecting surfaces 32 is minimal. The truss and vertical reflecting surface arrangement shown in FIGS. 1-4 thereby provide a rigid design adapted to minimize heave in use.

Referring now to FIGS. 5-9 there is shown the mooring or anchoring system 60 of the present invention. As described above, the mooring or anchoring system 60 provides an anchoring means for anchoring the breakwater device which is adapted to act substantially through the action center of the breakwater in order to minimize roll of the structure. Referring to FIGS. 7-9, in the preferred embodiment, the anchoring system 60 includes a mooring winch 62 secured to a mooring post 26 which is, in turn, secured between the first and second rear support trusses 20 and 22 as described above and shown in FIGS. 1-4. A mooring line 64 extends from the mooring winch 62 and is securable to the bottom of the body of water in which the breakwater is positioned by suitable means known to those of ordinary skill in the art.

In the preferred embodiment, the anchoring system 60 further includes an action center mooring line guide 66 connected to the mid-span truss 12 to direct the line of action of the anchor forces through the action center of the breakwater. The action center mooring line guide 66 may be comprised of any of a number of commercially available sleeve assemblies adapted to receive and support a mooring line passing therethrough. As shown in FIGS. 7-9, in the preferred embodiment, the guide 66 has a funnel-shaped configuration and is positioned with the flared end of the funnel directed toward the mooring winch 62.

While the action center mooring line guide 66 is shown in the preferred embodiments to align with the mid-span truss 12, it should be understood that the action center mooring line guide 66 may be displaced in front of or behind the mid-span truss 12 if the resultant buoyant force does not align with the mid-span truss 12 in use. As described above, the placement of the action center mooring line guide 66 will depend upon the particular design of each breakwater device and must be approximated for each design.

Further, in the preferred embodiment, each breakwater device includes at least two mooring winch-mooring line assemblies (62-64) spatially mounted thereon in order to prevent yaw of the breakwater device. In the preferred embodiment, a mooring winch 62 and a mooring line 64 are disposed in each open section 40 of the breakwater device, with the mooring line 64 extending forwardly to the bottom of the body of water. It should be appreciated, however, that as few as two mooring winch-mooring line assemblies may be utilized and that more than one in each open space may be utilized in accordance with the present invention. It is only important that the mooring lines act approximately through the action center in order to minimize roll.

While in the preferred embodiment, the anchoring system 60 includes a mooring line 64 which is passed through an action center mooring guide 66 to provide an anchoring means acting through the action center in accordance with the present invention, it should be appreciated that other anchoring means may be provided which similarly act through the action center. For example, it may be possible to determine the required scope of the mooring lines 64 necessary to cause the mooring lines 64 to pass through the action center without the assistance of an action center mooring guide 66. In this embodiment, the length of the mooring line 64 would need to be varied with changes in the depth of the water in order to maintain the required scope to cause the mooring line 64 to act through the action center.

In an alternative embodiment, shown in FIGS. 16 and 17, suitable for use in shallow water, the breakwater may be anchored in place through the use of pilings. In this embodiment, a collar member 76 is movably attached to each piling 77 to allow for vertical movement up and down the piling 77 by the collar 76. In the preferred aspect of this embodiment, the collar 76 is then secured to the breakwater by braces 78 along the "action center" to minimize roll of the breakwater. As shown in FIGS. 16 and 17, the mid-span truss 12 may be eliminated from this embodiment of the invention if desired. It should be understood, for this embodiment, that the use of a slidable collar 76 and a vertical piling 77 essentially eliminates the vertical force component of the anchoring system generally encountered by the breakwater device. For this embodiment, therefore, it is only important that the collar 76 be attached along the line of action of the horizontal force component in order to provide satisfactory performance of this embodiment of the anchoring means.

Referring to FIGS. 7 and 8, the anchoring means 60 of the present invention may further include secondary mooring lines 68 to provide stability for the breakwater from waves or other forces generated behind the breakwater. For example, as shown in FIG. 7, the breakwater may include a secondary winch 69 suitably attached to the mooring post 26. Since wave forces are seldomly anticipated from behind the breakwater, the mooring line 68 may then proceed down the mooring post 26, where it may be passed over a pulley (not shown) and proceed outwardly to be anchored to the bottom of the particular body of water. Alternatively, if significant wave forces are anticipated behind the breakwater, a pulley may be mounted to the mid-span truss 12 at the projected action center of the breakwater. The mooring line 68 would then be passed through the pulley located at the action center and extended rearwardly to be anchored to the bottom.

Referring now to FIG. 8, in an alternative embodiment, the anchoring means includes a dead weight 70 attached to the secondary mooring line 68. A pulley 72 is supported by a cable 75 which is attached to the breakwater at the action center. The secondary mooring line 68 is then passed over the pulley 72 such that the dead weight 70 is suspended beneath the breakwater as shown in FIG. 8. It should be appreciated that the utilization of the dead weight secondary mooring means shown in FIG. 8 should be included in the computation of the buoyant force when determining the location of the action center. Alternatively, a pulley may be located at the action center of the breakwater.

The breakwater device of the present invention may utilize any of a number of flotation means known to those of ordinary skill in the art. It is only important that the members providing buoyancy to the breakwater be positioned behind the vertical wave reflecting surfaces 32 in use such that the effect of the forces of the impinging waves on the flotation devices to cause heave is minimized. The exact selection of flotation members will depend upon the options included (such as decking, etc.) on each breakwater device. It is believed that the selection and design of the flotation members is within the knowledge and skill of those of ordinary skill in the art and that further description is not necessary. For the sake of clarity, however, there is shown in FIGS. 10-12 an example of a flotation system suitable for use in accordance with the present invention.

Referring first to FIG. 10, the flotation system 80 of the present invention may include a plurality of flotation billets 82, one of which is shown as the shaded area in FIG. 10. As shown in FIG. 12, flotation billets 82 of varying thickness may be stacked on top of each other to account for varying weight distribution in order to maintain the breakwater level in use. The selection of the thickness and type of billet to be used will depend upon the weight of the particular breakwater and is known to those of ordinary skill in the art.

Accordingly, the present invention provides a breakwater design which includes an anchoring means suitable for minimizing roll of the breakwater device. The present invention also provides a breakwater design which is adapted to be rigid, while at the same time minimizing heave.

The instant invention has been disclosed in connection with a specific embodiment. However, it will be apparent to those skilled in the art that variations from the illustrated embodiment may be undertaken without departing from the spirit and scope of the invention. For example, as described in U.S. Pat. No. 3,800,543, the breakwater device may include surfaces disposed in more than one pair of parallel planes. Moreover, other supporting frameworks made of differing materials such as concrete or fiberglass may be utilized. These and other variations will be apparent to those skilled in the art in view of the above disclosure and are within the spirit and scope of the invention.

As used in the specification and in the appended claims, it should be understood that the word connect or any derivative thereof implies not only a direct, immediate connection between the two recited parts, but also embraces the various arrangements wherein the parts are operatively connected, although other elements may be physically located or eliminated between the connected parts. Further, the word "a" does not preclude the presence of a plurality of elements accomplishing the same function. For example, "a mooring line" should be understood to include either a single mooring line or a pair of mooring lines carrying out the same function.

What is claimed is:

1. A mobile, bouyant structure, comprising:

a plurality of substantially vertical wave reflecting surfaces;

means for supporting said wave reflecting surfaces in a substantially vertical position so that waves impinging thereon will be reflected back upon themselves;

said reflecting surfaces being arranged in a first set of surfaces and a second set of surfaces;

said first set of surfaces being spacially located in substantially a first single vertical plane and said second set of surfaces being spacially located in substantially a second single vertical plane, the surfaces in the first vertical plane being disposed in use such that approaching waves impinge said surfaces before impinging on the surfaces in the second vertical plane;

said first vertical plane being separated from said second vertical plane by a distance, measured in the direction of approach of impinging waves in use, approximately equal to one-half the wave length of the waves expected to impinge upon the surfaces located in said planes;

the sum of the surface area of all the surfaces in the first vertical plane being approximately equal to the sum of the surface area of all surfaces in the second vertical plane;

the number and arrangement of all reflecting surfaces being such that the net moment about the center of the structure span approximates zero in order to minimize yaw of the structure in use;

the surfaces in the second vertical plane being separated from one another and arranged in such fashion and the surfaces in the first vertical section being separated from each other and arranged in such fashion that each surface in the second vertical plane lies directly behind a gap between the surfaces of the first vertical plane; and anchoring means for anchoring said structure in place, the structure having a resultant buoyant force acting substantially in a vertical plane of action and a resultant horizontal force for a selected design wave acting substantially in a horizontal plane of action, said anchoring means being connected to the structure and positioned to act substantially through an action center of the structure in order to minimize roll of the structure and to minimize the creation of a couple by the anchoring means, the location of said action center being approximated by the intersection of the plane of action of the resultant buoyant force on the structure and the plane of action of the resultant horizontal force on the structure for a selected design wave.

2. The structure of claim 1 wherein the anchoring means includes two spatially located action center mooring guides mounted to the structure, each mooring guide being positioned approximately at the action center, and a mooring line corresponding to each mooring guide, each mooring line being connected at one end to the structure and positioned to pass through the mooring guide to be securable to the bottom of a body of water in use.

3. A mobile, buoyant structure comprising:

a plurality of substantially vertical wave reflecting surfaces;

means for supporting said wave reflecting surfaces in a substantially vertical position so that waves impinging thereon will be reflected back upon themselves;

said wave reflecting surfaces being arranged in at least two sets of one or more surfaces, each of the said sets being spatially located in substantially a single vertical plane;

each said vertical plane being separated by a distance measured in the direction of approach of impinging waves, approximately equal to one-half the wavelength of the waves expected to impinge upon said surfaces;

the surfaces in each said vertical plane being separated from one another and arranged in such fashion that each surface lies directly behind a gap between the surfaces of the plane in front thereof;

the sum of the surface area of all the surfaces in any one plane being approximately equal to the total surface area in each of the other planes;

the number and arrangement of all reflecting surfaces being such that the net moment about the center of the structure span approximates zero in order to minimize yaw of the structure; and an anchoring means for anchoring said structure in place, the structure having a resultant buoyant force acting substantially in a vertical plane of action and a resultant horizontal force for a selected design wave acting substantially in a horizontal plane of action, said anchoring means being connected to the structure and positioned to act substantially through an action center of the structure in order to minimize roll of the structure and to minimize the creation of a couple by the anchoring means, the location of said action center being approximated by the intersection of the plane of action of the resultant buoyant force on the structure and the plane of action of the resultant horizontal force on the structure for a selected design wave.

4. A method of securing a breakwater to minimize roll of the breakwater in use, the breakwater having a resultant buoyant force acting substantially in vertical plane of action and a resultant horizontal force for a selected design wave acting substantially in a horizontal plane of action, which method comprises the steps of:

securing a positioning device to a floor of a body of water in which the breakwater is located; and attaching the positioning device to the breakwater and positioning the device relative to the breakwater such that the forces exerted by the positioning device on the breakwater act substantially through an action center of the breakwater, the location of the action center being approximated by the intersection of the plane of action of the resultant buoyant force and the plane of action of the resultant horizontal force.

5. The method of claim 4 in which the positioning device is a mooring line, characterized in that the mooring line is attached to the breakwater by passing the mooring line through a mooring guide connected to the breakwater, the mooring guide being positioned approximately at the action center of the breakwater.

* * * * *